(12) United States Patent
Zamprogno et al.

(10) Patent No.: US 11,422,044 B2
(45) Date of Patent: Aug. 23, 2022

(54) RESISTIVE BRIDGE SENSOR WITH TEMPERATURE COMPENSATION

(71) Applicant: STMicroelectronics S.r.l., Agrate Brianza (IT)

(72) Inventors: Marco Zamprogno, Cesano Maderno (IT); Andrea Barbieri, Casalpusterlengo (IT); Pasquale Flora, Varese (IT); Raffaele Enrico Furceri, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 143 days.

(21) Appl. No.: 16/877,746

(22) Filed: May 19, 2020

(65) Prior Publication Data

US 2021/0364375 A1    Nov. 25, 2021

(51) Int. Cl.
  *G01L 1/22*    (2006.01)
  *G01B 7/16*    (2006.01)
  *G01D 5/16*    (2006.01)

(52) U.S. Cl.
  CPC .............. *G01L 1/2281* (2013.01); *G01B 7/18* (2013.01); *G01D 5/16* (2013.01)

(58) Field of Classification Search
None
See application file for complete search history.

(56) References Cited

U.S. PATENT DOCUMENTS

| | | | |
|---|---|---|---|
| 4,866,312 A | 9/1989 | Kearney et al. | |
| 5,228,337 A * | 7/1993 | Sharpe | B60C 23/0408 340/445 |
| 5,343,755 A | 9/1994 | Huss | |
| 6,316,970 B1 | 11/2001 | Hebert | |
| 7,005,915 B2 | 2/2006 | Kilian et al. | |
| 10,897,234 B2 | 1/2021 | Zamprogno et al. | |
| 2017/0123551 A1 | 5/2017 | Li et al. | |

FOREIGN PATENT DOCUMENTS

GB    2251947 A    7/1992

OTHER PUBLICATIONS

EPO Search Report and Written Opinion for co-pending EP Appl. No. 21171960.4 dated Oct. 12, 2021 (8 pages).

* cited by examiner

*Primary Examiner* — Brandi N Hopkins
*Assistant Examiner* — Nigel H Plumb
(74) *Attorney, Agent, or Firm* — Crowe & Dunlevy

(57) ABSTRACT

A bridge driver circuit applies a bias voltage across first and second input nodes of a resistive bridge circuit configured to measure a physical property such as pressure or movement. A sensing circuit senses drive current, bias current and common mode current for the bridge driver and sums the sensed currents to generate a source current. The source current is processed to determine a normalized resistance and temperature of the resistive bridge circuit and from which a temperature dependent sensitivity of the resistive bridge circuit is determined. A voltage output at first and second output nodes of the resistive bridge circuit is processed to determine a value of the physical property. This processing further involves applying a temperature correction in response to the determined temperature dependent sensitivity.

50 Claims, 5 Drawing Sheets

RESISTIVE BRIDGE SENSOR WITH TEMPERATURE COMPENSATION

TECHNICAL FIELD

The present disclosure generally concerns a resistive bridge circuit and, in particular, a circuit for providing temperature compensation to a signal output by the resistive bridge circuit.

BACKGROUND

Figure 1:
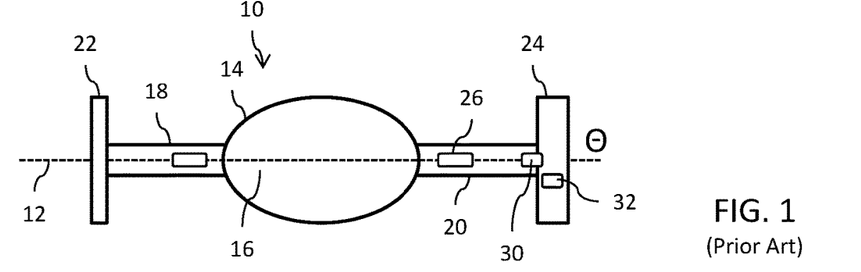
FIG. 1 is a top view of a micro-electromechanical system (MEMS) device.

Reference is made to FIG. 1 which shows a top view of a micro-electromechanical system (MEMS) device 10 which is configured to support oscillation about an axis 12. The device 10 includes a main body 14 which includes, in a given system scanning application, a mirror surface 16. The main body 14 is suspended over a cavity (not explicitly shown in this top view) through first and second torsion (spring) arms 18 and 20 between anchor structures 22 and 24, respectively. A drive means 26 having a configuration well known to those skilled in the art (for example, of capacitive type) is provided at each torsion arm 18, 20. Actuation of the drive means 26 in response to a drive signal (for example, an AC signal) induces an oscillatory movement of the main body 14 about the axis 12. The mirror surface 16 receives a laser signal and reflects that received laser signal toward a target surface. Oscillation about the axis 12 causes the reflected laser signal to scan across the target surface.

Figure 2:
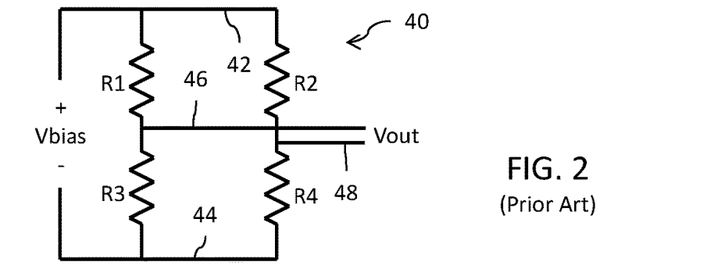
FIG. 2 is a schematic diagram of a Wheatstone bridge circuit.

It is important to know the mechanical angle of the oscillating movement of the main body 14 about the axis 12 in order to support accurate operation of the control loop driving the oscillation of the mirror. A physical property (such as a pressure/angle) sensor 30 is mounted at or near the rotational spring anchor point between at least one of the torsion (spring) arms 18 and 20 and a corresponding one of the anchor structures 22 and 24. The sensor 30 is typically formed by a resistive-type sensor element, wherein a resistance of the resistive-type sensor element is mechanical stress dependent and thus varies (preferably substantially linearly) with change in the mechanical angle θ of the oscillating movement of the main body 14 about the axis 12. The sensor 30 responds to a change in the mechanical angle of the main body with a change in resistance value which can be sensed and processed. The resistive-type sensor element is typically formed by a Wheatstone bridge circuit 40 as schematically shown in FIG. 2. A bias voltage Vbias is applied between input nodes 42 and 44 and an output voltage Vout is generated between output nodes 46 and 48. A first resistor R1 is connected between node 42 and node 46. A second resistor R2 is connected between node 42 and node 48. A third resistor R3 is connected between node 44 and node 46. A fourth resistor R4 is connected between node 44 and node 48. The resistors R1-R4 all have a same nominal resistance value R. However, in response to the mechanical stress induced at the sensor 30 by the oscillating movement of the main body 14, there is a change in the value of the resistance ΔR for one or more of the resistors R1-R4 which causes a change in the output voltage Vout in accordance with the equation:

$$Vout = \frac{\Delta R}{R} \cdot Vbias$$

The value of Vout is accordingly dependent on the motion status σ(t) of the MEMS device 10 (i.e., the mechanical angle Θ), the temperature dependent sensitivity S(T) of the MEMS device 10 and the bias voltage Vbias applied to the bridge circuit 40 in accordance with the equation:

$$Vout = S(T) \cdot \sigma(t) \cdot Vbias$$

where: ΔR/R is equal to the temperature dependent sensitivity S(T) of the bridge multiplied by the mirror angle σ(t).

Thus, achieving an accurate measurement of the motion status of the MEMS device 10 requires, in addition to knowledge of the bias voltage Vbias applied to the bridge and the output voltage Vout from the bridge, knowledge of the temperature dependent sensitivity S(T) of the MEMS device 10 which is given by the equation:

$$S(T) = S_0(1 + \alpha_{S1} \cdot \Delta T + \alpha_{S2} \cdot \Delta T^2)$$

where: $\alpha_{S1}$ is the first-order temperature coefficient that relates the sensitivity to the temperature; and $\alpha_{S2}$ is the second-order temperature coefficient that relates the sensitivity to the temperature.

It is then necessary to compensate for the sensitivity over the temperature range of the operation for the MEMS device 10. This can only be accomplished if the temperature variation ΔT (i.e., the difference between the actual temperature and some reference temperature) is known.

With reference once again to FIG. 1, it is common then to further include a temperature sensor 32 in the MEMS device 10. As an example, the temperature sensor 32 may be located in the anchor structure 22 or 24, wherein a resistance of the sensor element is temperature dependent and thus varies (preferably substantially linearly) with change in the temperature at the MEMS device. The thermally-dependent resistive effect of the sensor 32 translates the temperature into a change in resistance value which can be sensed and processed. The sensor element is typically formed by a separate Wheatstone bridge circuit (similar in configuration to the bridge circuit 40 as schematically shown in FIG. 2). The value of Vout of the bridge in this case is dependent on the temperature and, from the sensed voltage, the actual temperature of the MEMS device 10 can be computed. From this, the temperature change is known and the sensitivity can then be determined from the foregoing equation and used to compensate the motion status of the MEMS device 10.

There are a number of drawbacks with this system configuration including: a) the need for more electrical connections to the MEMS device 10 to support the application of the bias voltages and the sensing of the output voltages from two distinct Wheatstone bridge circuits (one for pressure/angle and another for temperature); b) an increased complexity in fabrication of the MEMS device 10 due to additional masks and processing steps; c) an added cost of fabrication; d) a lack of precision since the temperature sensing is performed near to, but not exactly at, the location of the pressure/angle sensing; e) an increase in occupied circuit area due to the inclusion of the additional temperature sensing bridge circuit.

There is accordingly a need in the art to provide a better solution which supports temperature compensation with a pressure/angle sensing resistive bridge circuit.

SUMMARY

In an embodiment, a circuit comprises: a bridge driver circuit configured to apply a bias voltage across first and second input nodes of a resistive bridge circuit; a sensing circuit configured to sense a bridge current that flows through said resistive bridge circuit in response to the applied bias voltage; a first processing circuit configured to determine a temperature dependent sensitivity of said resistive bridge circuit from the sensed bridge current; and a second processing circuit configured to process a voltage output at first and second output nodes of said resistive bridge circuit and apply a temperature correction in response to the determined temperature dependent sensitivity.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

The terms "about", "substantially", and "approximately" are used herein to designate a tolerance of plus or minus 10%, preferably of plus or minus 5%, of the value in question.

Figure 3:
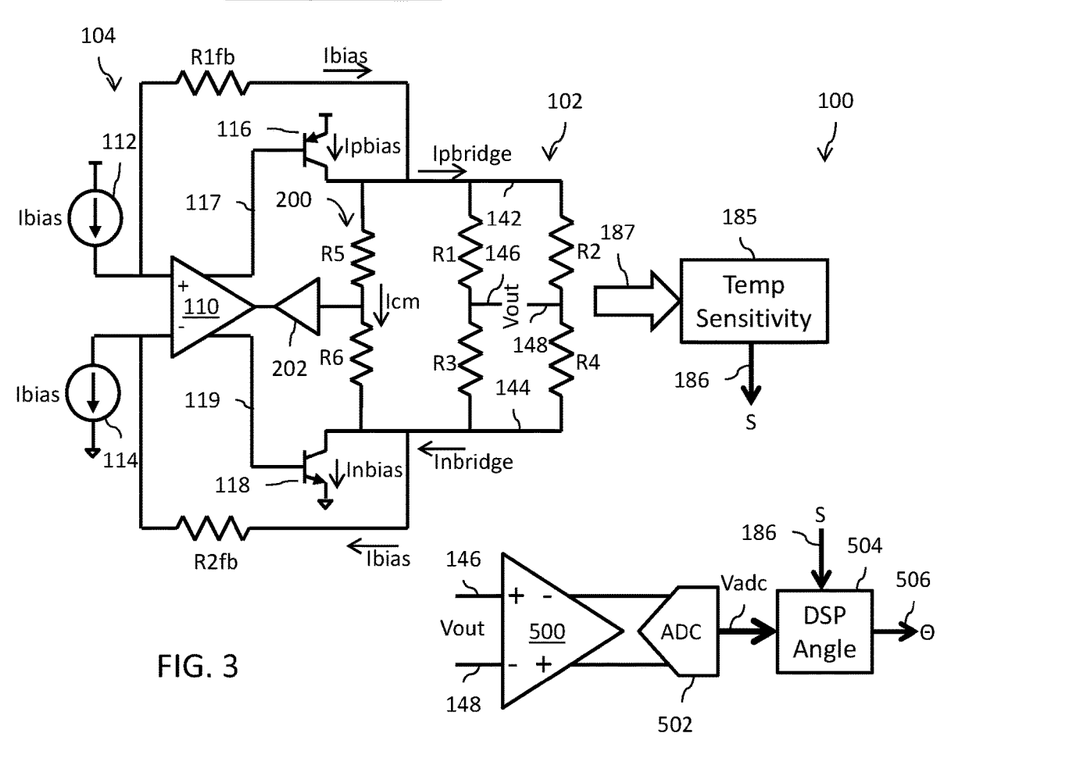
FIG. 3 is a schematic diagram of a MEMS sensing system.

Reference is now made to FIG. 3 showing a schematic diagram of a MEMS sensing system 100. The system 100 includes a resistive Wheatstone bridge circuit 102 that is biased by a driver circuit 104. The resistive Wheatstone bridge circuit 102 comprises input nodes 142 and 144 and output nodes 146 and 148. The driver circuit 104 applies a bias voltage Vbias across input nodes 142 and 144. An output voltage Vout is generated across output nodes 146 and 148. A first resistor R1 is connected between node 142 and node 146. A second resistor R2 is connected between node 142 and node 148. A third resistor R3 is connected between node 144 and node 146. A fourth resistor R4 is connected between node 144 and node 148. The resistors R1-R4 all have a same nominal resistance value R. In an embodiment, the Wheatstone bridge circuit 102 forms a pressure/angle sensor 30 (see FIG. 1) for a MEMS device.

The driver circuit 104 includes an operational amplifier 110 having a non-inverting input and an inverting input as well as a single-ended, non-inverting output comprising two voltage shifted output signals 117, 119. An output stage of the amplification for the driver circuit 104 includes a first transistor 116 that is controlled by the one of the voltage shifted output signals 117 of the amplifier 110 and connected to the input node 142 of the bridge. The output stage further includes a second transistor 118 that is controlled by the other of the voltage shifted output signals 119 of the amplifier 110 that is connected to the input node 144 of the bridge.

The first and second transistors 116 and 118 may, for example, comprise bi-polar transistor devices with collector terminals connected, respectively, to the input nodes 142 and 144. The collector terminals of the first and second transistors 116, 118 accordingly form differential output nodes of the driver circuit 104 for applying the differential voltage bias Vbias to the bridge 102, with transistor 116 providing a corresponding drive circuit current Ipbias and the transistor 118 sinking a corresponding drive current Inbias, where the currents Ipbias and Inbias are the necessary currents to satisfy the biasing conditions imposed by the driver circuit 104 forcing the bias voltage Vbias between nodes 142 and 144. The first transistor 116 has an emitter coupled to the supply voltage node (Vdd) and a base driven by one of the output signals 117 from the amplifier 110, with the collector coupled to source the current Ipbias to the input node 142 of the bridge circuit 102. The second transistor 118 has an emitter coupled to the ground node and a base driven by the other of the output signals 119 from the amplifier 110, with the collector coupled to sink the current Inbias from the input node 144 of the bridge circuit 102. It is preferred to use bipolar transistor devices for the transistors 116, 118 because bipolar transistor devices can remove flicker noise. It will be understood, however, that in some applications it is possible to use MOSFET devices for the transistors 116, 118.

A feedback resistor R1fb is connected between the non-inverting input of the amplifier 110 and the input node 142 of the bridge circuit 120 (at one of the differential output nodes of the driver circuit 104). A feedback resistor R2fb is connected between the inverting input of the amplifier 110 and the input node 144 of the bridge circuit 120 (at the other of the differential output nodes of the driver circuit 104). The feedback resistors R1fb and R2fb have a same resistance value (Rfb) and set the closed loop gain of the amplification provided by the driver circuit. A first current source 112 is connected to source a current Ibias generated from a supply voltage node (for example, Vdd) to the non-inverting input of amplifier 110, that bias current is configured to flow through the feedback resistor R1fb to the driver circuit output at the input node 142 of the bridge circuit. A second current source 114 is connected to sink the current Ibias at the non-inverting input of amplifier 110 to a ground node, that bias current configured to flow through the feedback resistor R2fb from the driver circuit output at the input node 144 of the bridge circuit. With this circuit configuration, the bias voltage Vbias applied between the input nodes 142 and 144 of the bridge circuit 120 is accordingly equal to 2*Rfb*Ibias.

Because of the differential structure adopted for the driver circuit 104, a common mode feedback is needed to set the common mode voltage of the output of amplifier 110. A common mode current Icm flows through a common mode resistive divider circuit 200 that is formed by resistors R5 and R6 which are connected in series between input nodes 142 and 144 of the bridge circuit 102. The resistors R5 and R6 have a same resistance value. A tap node at the series connection of resistors R5 and R6 is coupled to an input of a feedback amplifier 202 functioning as a buffer circuit. An output of the amplifier 202 is coupled to set the common mode voltage of the amplifier 110.

Thus, the current Ipbridge flowing into the bridge circuit 120 at the input node 142 is equal to the bias current Ibias plus the drive circuit current Ipbias minus the common mode current Icm. The current Inbridge flowing from the bridge circuit 120 at the input node 144 is equal to the bias current Ibias plus the drive circuit current Inbias minus the common mode current Icm.

The output voltage Vout from the bridge circuit 102 is processed to determine the motion status measurement (for example, the angle of deflection Θ) of the MEMS. The differential signal Vout is processed through an analog front end (AFE) circuit 500 which conditions the signal for further processing. For example, the AFE circuit 500 performs amplification and filtering of the differential signal Vout to achieve a desired signal-to-noise ratio. A sigma-delta analog to digital converter (ADC) 502 converts the analog signal output from the AFE circuit 500 to a digital signal Vadc. The digital signal Vadc represents the angular deflection of the MEMS. A digital signal processing (DSP) circuit 504 processes the digital signal Vadc to produce a digital signal 506 representative of an angular deflection Θ of the MEMS. This DSP processing operation is well known to those skilled in the art.

It is noted, however, that the differential signal Vout is also affected by the temperature dependent behavior of the bridge circuit 102 (as discussed above). A circuit 185 is configured to process current information 187 obtained relating to the driver circuit and bridge circuit to detect the temperature dependent sensitivity S(T) of the bridge circuit 102 and generate a sensitivity signal S 186. The digital signal processing (DSP) circuit 504 can then process the digital signal Vadc and use the sensitivity S output by the circuit 185 to correct for temperature and produce a digital signal 506 representative of the true angular deflection Θ of the MEMS. This DSP processing operation is well known to those skilled in the art. As an example, the DSP processing functions for determining the motion status include converting the output of the AFE into digital signal using a 5-bit Sigma Delta analog to digital converter (ADC). These digital signal samples are then averaged by a third order SINC filter that provides the decimation factor needed to reach the required data-rate. After this downsampling stage, the output is multiplied by the reciprocal (1/S) of the sensitivity and a bank of digital biquadratic filters performs a finer filtering action that allows for a cleaner recovery of angular deflection Θ of the MEMS.

It will accordingly be noted that in this implementation, the same bridge circuit 102 is used in connection with sensing the motion status of the MEMS as well as detecting temperature of the MEMS for the purpose of obtaining the temperature dependent sensitivity S(T) data. As previously noted, the temperature dependent sensitivity S(T) of the MEMS device 10 is obtained through a calibration and is given by the equation:

$$S(T)=S_0(1+\alpha_{S1} \cdot \Delta T+\alpha_{S2} \cdot \Delta T^2)$$

In order to utilize this equation, a measurement of the temperature of the bridge circuit 102 must be obtained by the circuit 185. Since we do not want to add an additional temperature sensing circuit (see, for example, reference 32, FIG. 1), a different temperature sensing technique must be used. It will be noted that the temperature of the bridge circuit 102 can be indirectly measured through a measurement of the resistance of the bridge. The resistance of the Wheatstone bridge depends on the temperature according to the following formula:

$$R(T)=R_0(1+\alpha_{R1} \cdot \Delta T+\alpha_{R2} \cdot \Delta T^2)$$

where: $\Delta T=T-T0$ which is the temperature variation with respect to a reference temperature T0 of 27° C.; $R_0$ is the resistance value at the reference temperature; and $\alpha_{R1}$ and $\alpha_{R2}$ are thermal coefficients dependent on technology—more specifically: $\alpha_{R1}$ is the first-order temperature coefficient that relates the bridge resistance to the temperature; and $\alpha_{R2}$ is the second-order temperature coefficient that relates the bridge resistance to the temperature.

The bridge resistance value is, in turn, extracted by circuit 185 through a measurement of current flowing through the bridge itself (i.e., the current Ipbridge=Inbridge) in response to the application of a known and constant voltage (i.e., Vbias) applied across the input nodes 142 and 144 of the bridge. As noted above, the current through the bridge circuit, either Ipbridge or Inbridge, is dependent on the bias current Ibias, the driver circuit currents Ipbias, Inbias and the common mode current Icm (collectively referred to herein as the current information 187). The circuit 185 collects the current information 187 by, for example, using the known current Ibias set by current sources 112 and/or 114, sensing the driver circuit currents Ipbias and/or Inbias and sensing the current Icm. These current collection operations can, for example, be implemented using appropriately configured current mirroring circuits and the determination of the current flowing through the bridge is accomplished though suitable current summation (for example, subtraction) circuitry.

Figure 4:
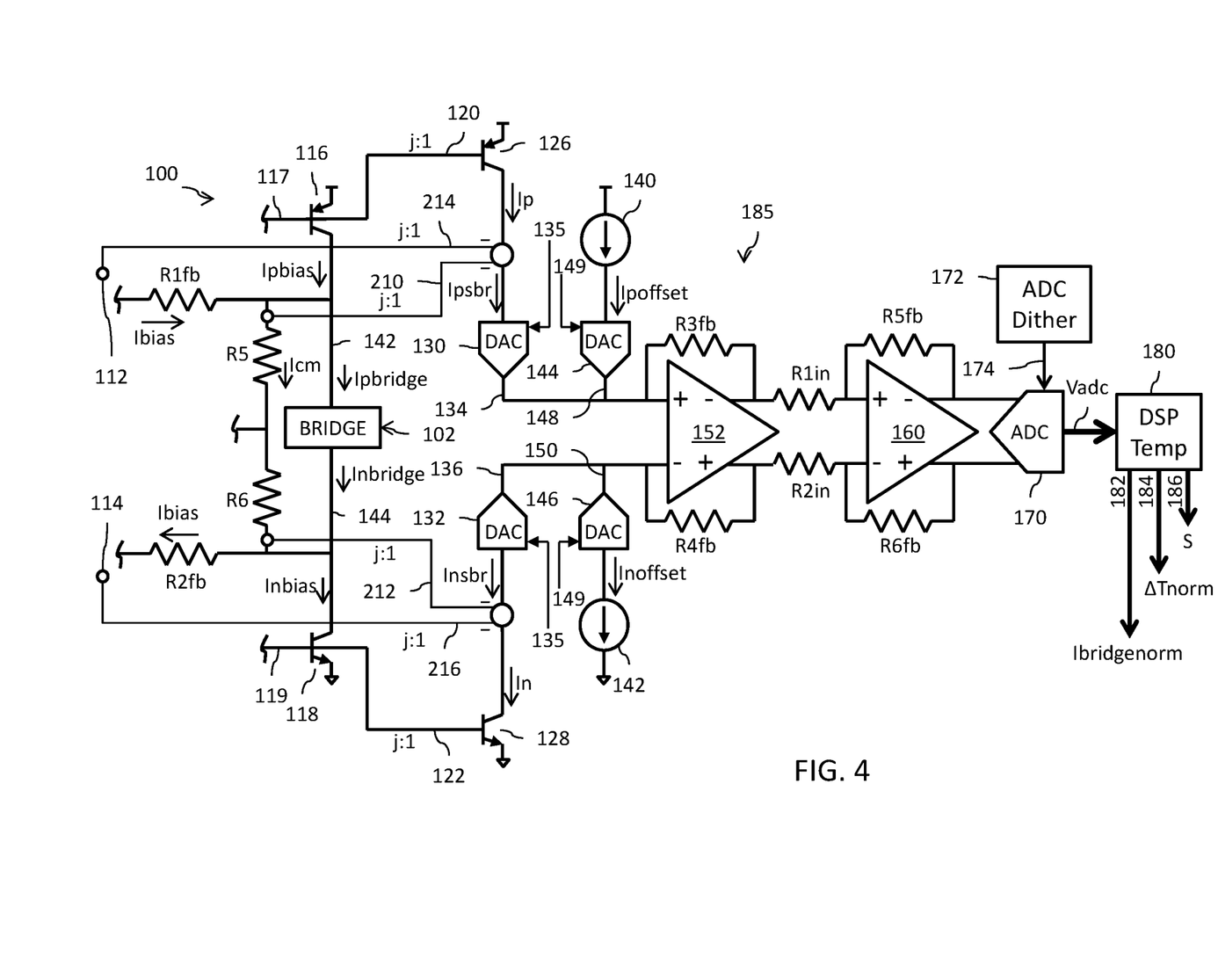
FIG. 4 shows additional circuit details for the circuit of FIG. 3.

Reference is now made to FIG. 4 which shows the current sensing and temperature dependent sensitivity circuit 185 in more detail. It will be noted that FIG. 4 omits illustration of some of the circuitry for the driver 104.

A first current mirroring circuit 120 mirrors the driver circuit current Ipbias that flows into the input node 142 such that a current source 126 generates a mirrored bridge bias current Ip that is equal to the driver output current Ipbias scaled by a scaling factor j (i.e., Ip=Ipbias/j). A second current mirroring circuit 122 mirrors the driver circuit current Inbias that is sunk from the input node 144 such that a current source 128 generates a mirrored bridge bias current In that is equal to the bridge bias current Inbias scaled by a scaling factor j (i.e., In=Inbias/j). The first and second current mirroring circuits 120 and 122 enable the collecting (reference 187) of the driver circuit currents Ipbias and Inbias by the temperature dependent sensitivity circuit 185. The current sources 126 and 128 may, for example, be implemented using bi-polar transistor devices having common emitters and bases in connection with bi-polar transistors 116 and 118, respectively, of the output stage circuit. The current source transistor 126 has an emitter coupled to the supply voltage node (Vdd), a base driven by one of the output signals 117 from the amplifier 110 (forming the current mirror 120 relationship with transistor 116 scaled by the mirror factor j) and a collector coupled to source the mirrored driver circuit current Ip. The current source transistor 128 has an emitter coupled to the ground node, a base driven by the other of the output signals 119 from the amplifier 110 (forming the current mirror 122 relationship with transistor 118 scaled by the mirror factor j) and a collector coupled to sink the mirrored driver circuit current In. It is preferred to use bipolar transistor devices for the current sources 126 and 128. The reason for this is that bipolar transistor devices can remove flicker noise. It will be understood, however, that in some applications it is possible to use MOSFET devices for the current sources 126 and 128.

A third current mirroring circuit 210 senses the common mode current Icm flowing through the common mode resistive divider circuit 200 and subtracts that current, scaled by the mirror factor j (i.e., the subtracted current is Icm/j), from the mirrored driver circuit current Ip. A fourth current mirroring circuit 212 senses the common mode current Icm flowing through the common mode resistive divider circuit 200 and subtracts that current, scaled by the mirror factor j (i.e., the subtracted current is Icm/j), from the mirrored driver circuit current In. The third and fourth current mirroring circuits 210 and 212 enable the collecting (reference 187) of the common mode current Icm by the temperature dependent sensitivity circuit 185. In this context, the currents Ipbias and Inbias are affected by an error due to the common mode current Icm, and the current mirroring circuits 210 and 212 effectively removes the error.

A fifth current mirroring circuit 214 is used to obtain a copy of the bias current Ibias from the current source 112 (i.e., this is the current flowing through the resistor R1$fb$) and subtracts that current, scaled by the mirror factor j (i.e., the subtracted current is Ibias/j), from the mirrored driver circuit current Ip. A sixth current mirroring circuit 216 is used to obtain a copy of the bias current Ibias from the current source 114 (i.e., this is the current flowing through the resistor R2$fb$) and subtracts that current, scaled by the mirror factor j (i.e., the subtracted current is Ibias/j), from the mirrored driver circuit current In. The fifth and sixth current mirroring circuits 214 and 216 enable the collecting (reference 187) of the bias current Ibias by the temperature dependent sensitivity circuit 185. In this context, the currents Ipbias and Inbias are affected by an error due to the feedback current Ibias, and the current mirroring circuits 214 and 216 effectively removes the error.

The subtraction of the common mode current Icm and the bias current Ibias from the mirrored bridge bias current Ip produces a sensed source bridge current Ipsbr (which is substantially equal to Ipbridge/j). Likewise, the subtraction of the common mode current Icm and the bias current Ibias from the mirrored bridge bias current In produces a sensed sink bridge current Insbr (which is substantially equal to Inbridge/j). These operations enable the collecting (reference 187) of the bridge current by the temperature dependent sensitivity circuit 185.

It will be noted that the scaling factor j can take on any suitable integer or fractional value. A value much greater than 1 is preferred in order to significantly reduce power consumption in the circuit 185.

The circuit 185 further includes a transimpedance amplifier 152 having a non-inverting input and an inverting input. A feedback resistor R3$fb$ is connected between the non-inverting input of the transimpedance amplifier 152 and an inverting output of the transimpedance amplifier 152. A feedback resistor R4$fb$ is connected between the inverting input of the transimpedance amplifier 152 and a non-inverting output of the transimpedance amplifier 152. The feedback resistors R3$fb$ and R4$fb$ have a same resistance value.

A current digital to analog converter (DAC) circuit 130 receives the sensed bridge current Ipsbr and outputs a scaled current 134 in response to a digital control signal 135 that specifies a scaling factor m to be applied by the DAC circuit 130 to the sensed bridge current Ipsbr. The scaled current 134 is equal to m*Ipsbr, where m is the scaling factor specified by the digital control signal 135. The scaled current 134 is applied to the non-inverting input of the transimpedance amplifier 152.

A current digital to analog converter (DAC) circuit 132 receives the sensed bridge current Insbr and outputs a scaled current 136 in response to the digital control signal 135 that specifies the scaling factor m to be applied by the DAC circuit 132 to the sensed bridge current Insbr. The scaled current 136 is equal to m*Insbr. The scaled current 136 is applied to the inverting input of the transimpedance amplifier 152.

A temperature independent current source 140 generates an offset current Ipoffset. A current digital to analog converter (DAC) circuit 144 receives the offset current Ipoffset and outputs a scaled current 148 in response to a digital control signal 149 that specifies a scaling factor k to be applied by the DAC circuit 144 to the offset current Ipoffset. The scaled current 148 is equal to k*Ipoffset, where k is the scaling factor specified by the digital control signal 149. The scaled current 148 is applied to the non-inverting input of the transimpedance amplifier 152.

A temperature independent current source 142 generates the offset current Inoffset. A current digital to analog converter (DAC) circuit 146 receives the offset current Inoffset and outputs a scaled current 150 in response to the digital control signal 149 that specifies the scaling factor k to be applied by the DAC circuit 146 to the offset current Inoffset. The scaled current 150 is equal to k*Inoffset. The scaled current 150 is applied to the inverting input of the transimpedance amplifier 152. In an embodiment, Ipoffset may be equal to Inoffset.

A driver circuit includes an operational amplifier 160 having a non-inverting input and an inverting input. An input resistor R1$in$ is coupled between the inverting output of the amplifier 152 and the non-inverting input of the amplifier 160. An input resistor R2$in$ is coupled between the non-inverting output of the amplifier 152 and the inverting input of the amplifier 160. The input resistors R1$in$ and R2$in$ have a same resistance value, and in an embodiment this resistance may be variable. A feedback resistor R5$fb$ is connected between the non-inverting input of the amplifier 160 and an inverting output of the amplifier 160. A feedback resistor R6$fb$ is connected between the inverting input of the amplifier 160 and a non-inverting output of the amplifier 160. The feedback resistors R5$fb$ and R6$fb$ have a same resistance value.

The driver circuit is configured to drive an analog to digital converter (ADC) circuit 170 with an analog output voltage Vout(T). The ADC circuit 170 includes differential inputs coupled to the inverting and non-inverting outputs, respectively, of the amplifier 160. The ADC circuit 170 generates a digital output signal Vadc.

An ADC dither circuit 172 applies a dither signal 174 to the ADC circuit 170.

A digital signal processor (DSP) circuit 180 processes the digital output signal Vadc to generate a signal 182 which is indicative of the bridge current Ibridge$_{norm}$, a signal 184 which is indicative of the change in temperature ($\Delta$Tnorm) of the bridge circuit 102, and a signal 186 which is indicative of the sensitivity (S) of the bridge circuit 102.

As previously noted, the resistance of the Wheatstone bridge depends on the temperature according to the following formula:

$$R(T)=R_0(1+\alpha_{R1} \cdot \Delta T + \alpha_{R2} \cdot \Delta T^2)$$

The current that flows through the bridge circuit is:

$$Ipbridge = Inbridge = \frac{\frac{Vbias}{R(T)}}{j} \cong \frac{Vbias}{j \cdot R_0(1+\alpha_{R1}\Delta T)} \approx \frac{Vbias}{j \cdot R_0} - \frac{Vbias}{j \cdot R_0}\alpha_{R1} \cdot \Delta T$$

where:

$$\frac{Vbias}{j \cdot R_0}$$

is the offset and $$\frac{Vbias}{j \cdot R_0}$$

$\alpha_{R1} \cdot \Delta T$ is the signal, and further wherein, for simplicity, only the linear coefficient has been considered.

It is necessary to apply a correction to both the gain and the offset in order to adapt the signal to the dynamic range of the ADC 170. The correction to the gain is effectuated through scaling factor m and the operation of the DACs 130 and 132. The correction to the offset is effectuated through the scaling factor k and the operation of the DACs 144 and 146.

Figure 5:
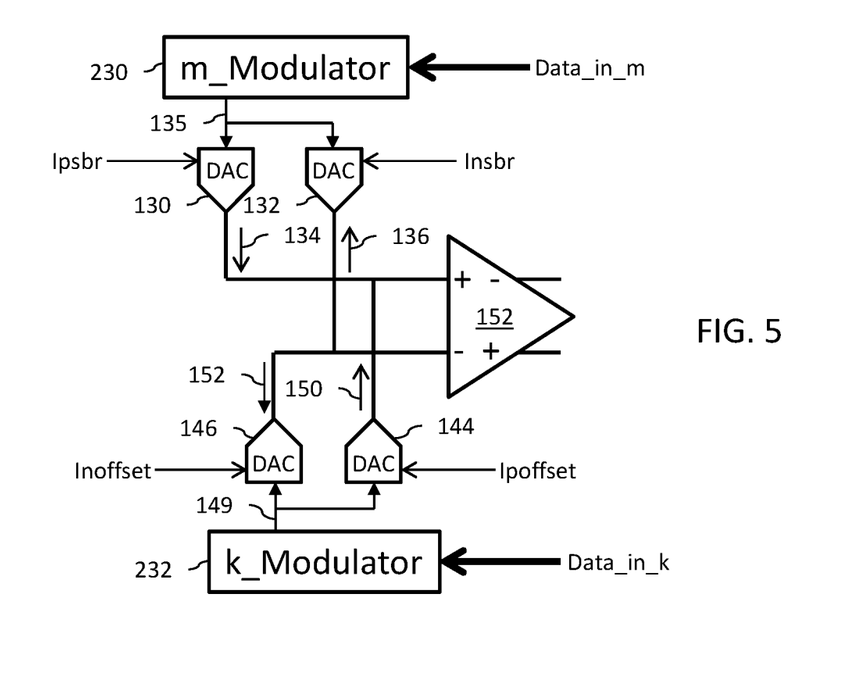
FIG. 5 shows a block diagram of gain and offset correction circuitry.

Reference is now made to FIG. 5 which shows a block diagram of the gain and offset correction circuitry. A digital control signal Data_in_m is applied to a first modulator circuit 230. The digital control signal Data_in_m may, for example, be an 8-bit signal and the first modulator circuit 230 is thus an 8-bit modulator which operates to produce the digital control signal 135 that is applied to control the operation of the DACs 130 and 132. The digital control signal 135 may, for example, be a 4-bit signal. The DAC 130 also receives the current Ipsbr (i.e., the scaled bridge current Ipbridge/j) and, in response to the logic states of the bits of the digital control signal 135, the DAC 130 scales the current Ipsbr by the factor m to generate the current signal 134 that is sourced to the non-inverting input of the amplifier 152. The DAC 132 also receives the current Insbr (i.e., the scaler bridge current Inbridge/j) and, in response to the logic states of the bits of the digital control signal 135, the DAC 132 scales the current Insbr by the factor m to generate the current signal 136 that is sunk from the inverting input of the amplifier 152.

A digital control signal Data_in_k is further applied to a second modulator circuit 232. The second modulator circuit 232 also may be an 8-bit modulator which operates to produce the digital control signal 149 that is applied to control the operation of the DACs 144 and 146. The digital control signal 149 may, for example, be a 4-bit signal. The DAC 144 also receives the current Ipoffset and, in response to the logic states of the bits of the digital control signal 149, the DAC 144 scales the current Ipoffset by the factor k to generate the current signal 148 that is sourced to the non-inverting input of the amplifier 152. The DAC 146 also receives the current Inoffset and, in response to the logic states of the bits of the digital control signal 149, the DAC 146 scales the current Inoffset by the factor k to generate the current signal 152 that is sunk from the inverting input of the amplifier 152.

The operational concept of the circuitry shown in FIG. 5 is to source a current (based on the current Ipsbr) to and sink a current (based on the current Insbr) from the differential inputs, respectively, of the amplifier 152. The currents Ipsbr and Insbr are directly representative of the Wheatstone resistive bridge currents Ipbridge and Inbridge. These currents must be translated into a voltage signal for amplification, filtering and conversion to the digital domain in order to be processed in connection with making the temperature dependent sensitivity determination.

The full-scale of currents Ipsbr and Insbr are not suitable to be directly processed through the analog front-end due to the presence of a gain error and an offset error that would strongly limit the accuracy of the read-out itself.

A measurement must be made of a variation on the bridge current due to temperature variation. With the currents Ipsbr and Insbr being scaled versions of the bridge current (Ipbridge and Inbridge, respectively), the variation in those currents must be read. However, this variation has a magnitude that is significantly lower than the 'absolute' value of the currents themselves. So, a preliminarily analog processing is performed on the currents Ipsbr and Insbr in order to subtract a sort of DC value and to adjust their gain versus temperature. In practice it is advantageous to subtract an offset equivalent to the value of the current at room (reference) temperature and to adjust the gain so that in the temperature range (from Tmin to Tmax) the currents show a variation (from Imin to Imax) that is able to exploit all the available analog front-end dynamic range.

The DACs 142 and 144 are tailored to subtract the offset current (starting from a temperature independent current) while DACs 126 and 128 receive the currents Ipsbr and Insbr, respectively, and apply a gain factor. As general approach, any kind of current DAC can perform these operations (i.e., offset generation for subtraction and gain variation). The circuit shown in FIG. 5 is only an example for a possible (advantageous) implementation of those operations. Since the two DACs have to provide two DC (constant) values with a not negligible accuracy, the best solution is to deal with an oversampled (i.e., sigma-delta) solution. The m-modulator receives a code (Data_in_m) representative of gain factor to be applied with a given resolution (i.e., 8 bit) and it provides to the DAC a modulated code (to a proper modulating frequency) with lower number of bits. This is the well-known oversampling. It is useful allowing to design the DAC with limited number of bits (i.e., 4-bits) able in any case (thanks to the sigma-delta modulation) to reach a higher resolution (i.e., 8-bits). The same concept is applied for the k-modulator that will work starting from a different and dedicated code (Data_in_k) representative of the offset to be provided.

Figure 6:
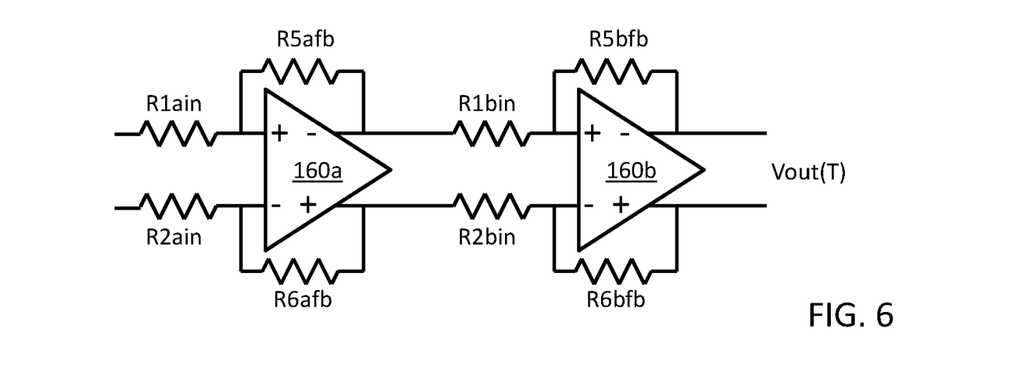
FIG. 6 shows a circuit diagram for an ADC driver circuit.

FIG. 4 illustrates the driver circuit for the ADC circuit 170 as including a single operational amplifier stage (reference 160). In an alternative embodiment, as shown in FIG. 6, the driver circuit for the ADC circuit 170 may be configured with two amplification stages. The driver circuit includes a first stage with an operational amplifier 160a having a non-inverting input and an inverting input. An input resistor R1ain is coupled between the inverting output of the amplifier 152 (FIG. 4) and the non-inverting input of the amplifier 160a. An input resistor R2ain is coupled between the non-inverting output of the amplifier 152 (FIG. 4) and the inverting input of the amplifier 160a. The input resistors R1ain and R2ain have a same resistance value. In an embodiment, the input resistors R1ain and R2ain may be variable resistors. A feedback resistor R5afb is connected between the non-inverting input of the amplifier 160a and an inverting output of the amplifier 160a. A feedback resistor R6afb is connected between the inverting input of the amplifier 160a and a non-inverting output of the amplifier 160a. The feedback resistors R5afb and R6afb have a same resistance value. The driver circuit further includes a second stage with an operational amplifier 160b having a non-inverting input and an inverting input. An input resistor R1bin is coupled between the inverting output of the amplifier 160a and the non-inverting input of the amplifier 160b. An input resistor R2bin is coupled between the non-inverting output of the amplifier 160a and the inverting input of the amplifier 160b. The input resistors R1bin and R2bin have a same resistance value. In an embodiment, the input resistors R1bin and R2bin may be variable resistors. A feedback resistor R5bfb is connected between the non-inverting input of the amplifier 160b and an inverting output of the amplifier 160b. A feedback resistor R6bfb is connected between the inverting input of the amplifier 160b and a non-inverting output of the amplifier 160b. The feedback resistors R5bfb and R6bfb have a same resistance value.

With this configuration, the output voltage Vout(T) which is applied to the input of the ADC circuit 170 is given by the following equation:

$$Vout(T) = -\left( \frac{m \cdot Gbias \cdot Vbias, ref}{j \cdot 2^{mbit} \cdot R_0(1+\alpha_{R1}\Delta T)} - \frac{k}{2^K} \cdot Gbias \cdot I_{OS} \right) \cdot Rtia \cdot G1 \cdot G2$$

where: M can be defined as the number of bits for m-modulator, where $2^M$ is the related (maximum) number of levels that can be generated through the gain DAC.

Consequently, m is the number of levels effectively selected in a specific case for m-DAC. So, the ratio ($m/2^M$) defines the gain factor provided through the m-DAC. The value k can be defined as the number of bits for k-modulator, where $2^K$ is the related (maximum) number of levels that can be generated through the offset DAC. Consequently, k is the number of levels effectively selected in a specific case for k-DAC. So, the ratio ($k/2^K$) defines the factor provided through the k-DAC (i.e., the value, once multiplied per $I_{OS}$, of the offset current). Vbias, ref is a reference voltage. Gbias is a gain that can be applied to the bias driver 104. In other words, the bias voltage applied to the sensor bridge can be programmed playing on Gbias value. It is useful to have the possibility to bias the bridge to different voltages depending on a trade-off between consumption and noise. G1 is the gain of amplifier 160a. G2 is the gain of the amplifier 160b. Different gains can be selected in order to better exploit the dynamic range of the analog front-end. The value j is mirroring factor for the bridge bias current. The value $R_0$ is the resistance value at the reference temperature. The value $\alpha_{R1}$ is a thermal coefficient as noted above. The value $\Delta T$ is the temperature variation with respect to the reference temperature. The value Rtia is the resistance of the feedback resistors R3fb, R4fb for the amplifier 152.

More specifically:

$$G1 = \frac{1}{Gbias} = \frac{Vbias, ref}{Vbias}$$

G2=constant, where the value of this constant is taken from a set of possible values selected to properly fit dynamic range requirements.

The operational amplifier 160a is used to compensate for the Vbias range that is used, and the operational amplifier 160b is used to compensate for the technology spread of the feedback resistors of the amplifier 152.

The expression of Vout(T) at the input of the ADC 170 can be rewritten in a more simplified form as:

$$Vout(T) = m \cdot \frac{A}{1+B \cdot \Delta T} + k \cdot C$$

where: A, B and C are three coefficients that must be known along with the scaling factors m and k that best fit the dynamic range of the ADC circuit 170. A calibration process can be performed to determine the best values for the scaling factors m and k.

The calibration process is as follows:

a) starting from a reasonable value for the scaling factors m and k, referred to as m0 and k0, and with the temperature T at the reference temperature T0 (i.e., T=T0 and thus $\Delta T$=0), set the control signals 135 and 149 to implement scaling by m0 and k0 and take a first measurement of the output voltage $Vout_1(T)$ in accordance with the equation:

$$Vout_1 = m0 \cdot A + k0 \cdot C$$

b) now choose a different reasonable value for the scaling factor k, referred to as k1, and with the temperature T at the reference temperature T0 (i.e., T=T0 and thus $\Delta T$=0), set the control signals 135 and 149 to implement scaling by m0 and k1 and take a second measurement of the output voltage $Vout_2(T)$ in accordance with the equation:

$$Vout_2 = m0 \cdot A + k1 \cdot C$$

c) solve the linear system:

$$\begin{cases} Vout_1 = m0 \cdot A + k0 \cdot C \\ Vout_2 = m0 \cdot A + k1 \cdot C \end{cases}$$

which has two variables A and C and two equations to find A and C.

d) with A and C now known, impose a temperature T that is different from T0 (i.e., T≠T0 and thus there is a $\Delta T$), and set the control signals 135 and 149 to implement scaling by m0 and k1 and take a third measurement of the output voltage $Vout_3(T)$ in accordance with the equation:

$$Vout_3 = m0 \cdot \frac{A}{1+B \cdot \Delta T} + k1 \cdot C$$

where everything but B is known.

e) solve the foregoing equation to find B.

f) now, with A, B and C known, find the values of m and k that best fit the dynamic range of the ADC circuit 170 by solving the linear system:

$$\begin{cases} Vout(Tmin) = -1 \\ Vout(Tmax) = +1 \end{cases}$$

where: Tmin is the minimum operative temperature and Tmax is the maximum operative temperature, to identify the scaling factors mbest and kbest. Then, set the control signals 135 and 149 to implement scaling by mbest and kbest, and end the calibration process.

Once calculated the parameters A, B and C, all the 'physical' parameters for the equation defining the output voltage are known. Values for m and k to be used in the next could be chosen in any case freely.

The calibration procedure allows with, only one temperature measurement different than the room (reference), one to define A, B and C and to then know all the physical values needed to solve the equation.

As previously noted, m and k are set by the user/designer. Since they are known starting from the beginning, they are not relevant for the equation. The values of m and k are simply chosen and then used in the equation and can be taken into account for the result evaluation. The key point of the calibration is to extract the A, B and C values.

So, the point is how m and k must be chosen once A, B and C have been evaluated. The idea is to exploit all the available dynamic range in the analog front-end. Output voltage Vout will be limited by the headroom in the analog front-end operational amplifiers 152 160. For instance, it is clear that the Vout will be limited between ground and the operational amplifier 160 supply voltage. In order to optimize the dynamic range (i.e., to improve signal-to-noise ratio) those skilled in the art can design the system so that, in the operative range, Vout will cover all the available voltage range.

Then, m and k will be consequently chosen so that for Tmin it results in V(Tmin)=min_voltage and for Tmax it results in V(Tmax)=max_voltage, where min_voltage and max_voltage are, respectively, the minimum and maximum voltages that can be linearly managed by the amplifier 160. So, in the digital domain, and assuming that the ADC 170 will output a normalized result of −1 when min_voltage is applied and a normalized result of +1 when max_voltage is applied, the same concept leads to the above solution.

Figure 7:
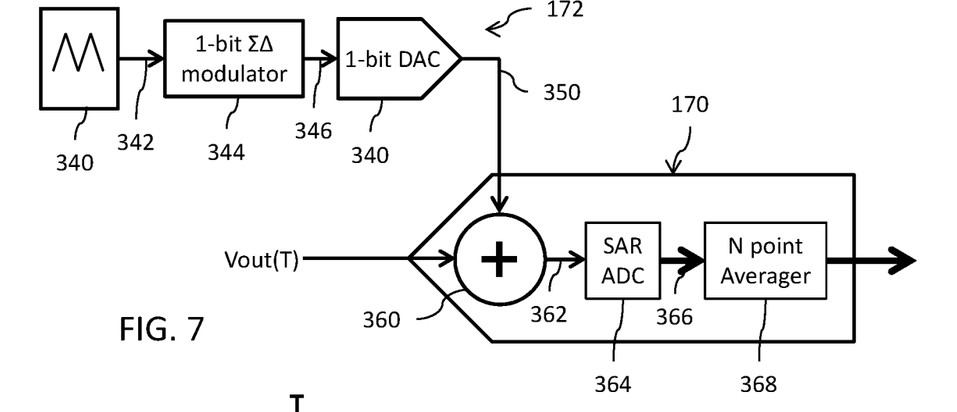
FIG. 7 shows a block diagram for the dithering of the analog signal being processed by the ADC circuit.

Reference is now made to FIG. 7 which shows a block diagram for the dithering of the analog signal being processed by the ADC circuit 170. The ADC dither circuit 172 includes a triangle wave generator 340 configured to output a triangle wave signal 342. The triangle wave signal 342 is input to a 1-bit sigma-delta modulator 344 that outputs a modulated signal 346. The modulated signal 146 is input to 1-bit digital to analog converter (DAC) circuit 348 that outputs the dithering signal 350.

The ADC circuit 170 includes an analog summing circuit 360 having a first input that receives the output voltage Vout(T) from the driver circuit and a second input that receives the dithering signal 350. The output of the analog summing circuit 360 is a triangular dithered analog output voltage signal 362 that is input to a successive approximation register (SAR) ADC converter circuit 364. As an example, the SAR ADC converter circuit 364 may be a 12-bit circuit generating a 12-bit digital signal 366. The effect of the triangular dithering of the output voltage Vout(T) is the uniform excitation of several ADC levels within the SAR ADC converter circuit 364. An averaging function can then be used to filter thermal noise and increase signal resolution to 16-bits. As an example, the averaging function can be implemented by an N point averager, wherein N>2048. The digital output signal from the ADC circuit 170 is then processed by the DSP circuit 180.

Figure 8:
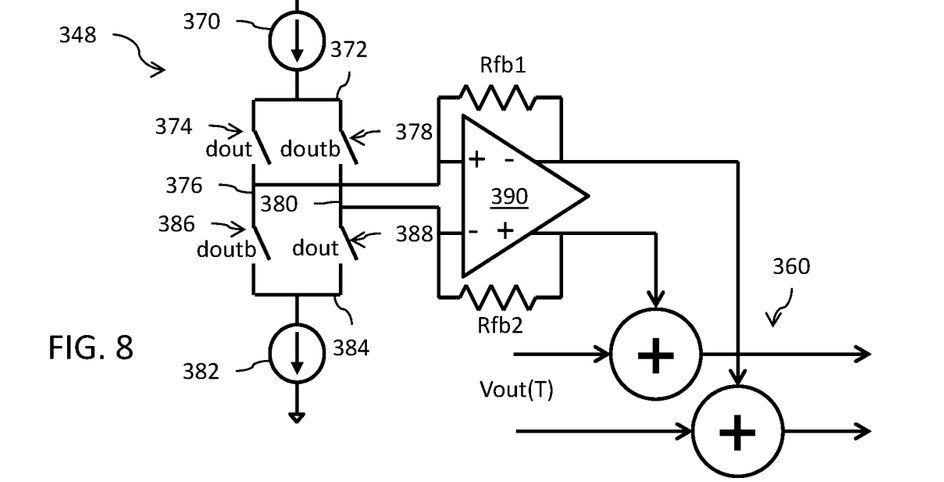
FIG. 8 shows a circuit diagram for a 1-bit digital to analog converter (DAC) circuit.

FIG. 8 shows a circuit diagram for the 1-bit digital to analog converter (DAC) circuit 348. The 1-bit sigma-delta modulator 344 modulates the triangle wave signal 342 to generate the modulated signal 346 as a single bit signal dout and its logical complement doutb. The DAC circuit 348 includes a first current source 370 coupled between a supply voltage node (Vdd) and a first input node 372. A first transistor switch 374 is coupled between node 372 and a first output node 376 and is driven by the signal dout. A second transistor switch 378 is coupled between node 372 and a second output node 380 and is driven by the signal doutb. A second current source 382 is coupled between a ground node and a second input node 384. A third transistor switch 386 is coupled between node 384 and the first output node 376 and is driven by the signal doutb. A fourth transistor switch 388 is coupled between node 384 and the second output node 380 and is driven by the signal dout.

The first output node 376 is coupled to a first input of a transimpedance amplifier 390. The second output node 380 is coupled to a second input of the transimpedance amplifier 390. A first feedback resistor Rfb1 is coupled between a first output of the transimpedance amplifier 390 and the first input. A second feedback resistor Rfb2 is coupled between a second output of the transimpedance amplifier 390 and the second input. The differential signal generated at the first and second outputs of the transimpedance amplifier 390 is a summed by the analog summing circuit 360 with the differential output voltage Vout(T) from the driver circuit.

In order to save area and power consumption, a preferred embodiment will use the amplifier 160b and resistors R5bfb and R6bfb to provide the amplifier 390 and resistors Rfb1 and Rfb2. In other words, in this implementation, the output nodes 376 and 380 are coupled to the non-inverting and inverting, respectively, inputs of the amplifier 160b.

The transimpedance amplifier 390 functions as a low pass filter. Since the temperature of the bridge circuit 102 is a slow frequency signal, the conversion can be obtained from the average of the N samples (>2048). The average time must be an integer multiple of the period of the triangular waveform signal 342 generated by circuit 340.

Figure 9:
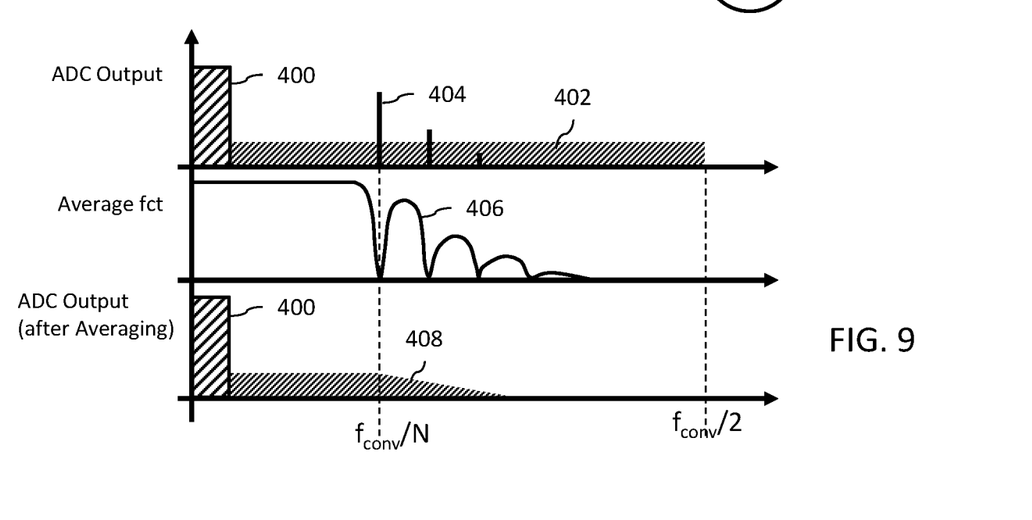
FIG. 9 shows a spectral representation of the advantage realized through use of the ADC dither.

The dither signal is a (sequence) of triangular waveforms. This signal has an average value equal to zero in one period. So, if this signal is added to the effective one at the input of the ADC, in order to do not change the value of the effective signal itself, ADC results must be averaged over an integer number of triangular waveforms periods. That operation, as described in the time domain, is shown in the frequency domain in FIG. 9 which presents a spectral representation of the advantage realized through use of the ADC dither. Signal 400 represents the temperature signal from the bridge circuit 102. Signal 402 represents the SAR input referred noise. Signal 404 represents the triangular dither. The frequency fconv is the ADC conversion frequency. The frequency $f_{conv}/2$ is accordingly the well-known Nyquist frequency. Signal 406 represent the filtering operation performed by the averaging function. Signal 408 represents the SAR input referred noise reduced by the filtering operation. The frequency $f_{conv}/N$ is the conversion frequency divided by the number of samples N used for averaging. In this context, it will be noted that the SAR input referred noise is reduced by: $1/\sqrt{N}$. FIG. 9 illustrates how the quantization noise (upper part of the figure) of the ADC is reduced (see, lower part of the figure) once the equivalent filter function is applied. This filter function, as shown, is a sinc(1) frequency translation of an averaging in the time domain. Sinc(1) theory provides for the equivalent bandwidth to be reduced by the factor N.

Figure 10:
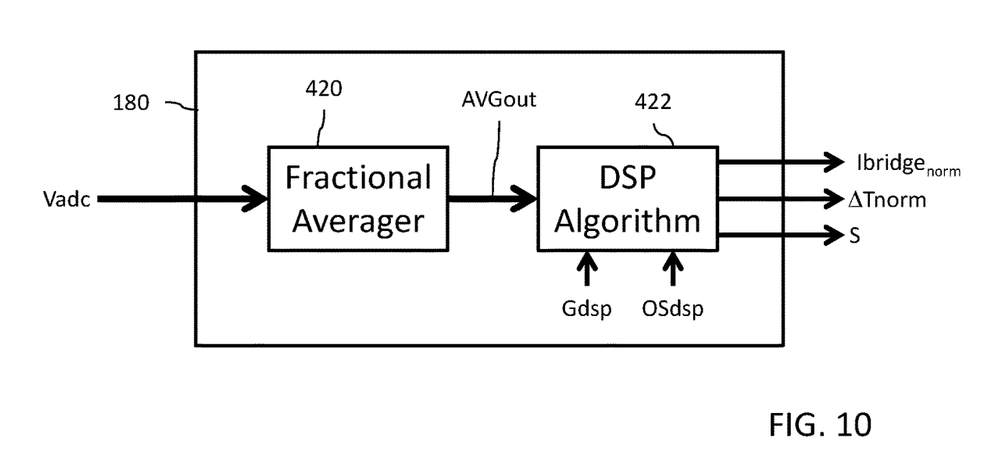
FIG. 10 shows a block diagram of the DSP.

Reference is now made to FIG. 10 which shows a block diagram of the DSP 180. The digital signal Vadc output by the ADC circuit 170 is processed by a fractional averager operation 420 to produce an averaged digital signal AVGout. The analog signal that is fed as input to the SAR ADC can be considered as being affected by two different kinds of disturbances that will prevent the DSP from giving accurate results. One disturbance is represented by the dither noise that is added to the analog signal in order to increase the ADC resolution and the other disturbance is generated by the motion component of the mirror that is superimposed on the current signal that is being processed by the analog signal processing chain (i.e., from the bridge circuit to the SAR ADC). These disturbances must be filtered out in order to prevent them from affecting the DSP calculations, thus ensuring the maximum accuracy of the DSP output results. The fractional averager operation 420 accordingly performs this filtering function.

In order to provide a proper filtering action for both disturbances, a first order SINC filter proves well suited as it can theoretically average through N ADC output samples in a way that the average window matches exactly an integer number of mirror cycles. For example, if the sampling period of the SAR ADC is Ts (where Fs=1/Ts), a N*Ts average window is performed according to the well-known formula:

$$\frac{\sum_{i=1}^{N} x[i]}{N}$$

In order to filter out both the dither noise and the mirror motion component, it is important that N*Ts be equal to an integer number of mirror cycles Tm (where Fm=1/Tm is the mirror frequency).

In any conventional SINC filter the average number N is an integer value. In this present case, however, N can also be fractional. This plays a key role in the filtering application as it allows for use of the same SAR ADC with the same Fs as there will always be a value of N such that N*Ts equals M*Tm for some integer value of M. This enables support for sensing any MEMS mirror, whatever its oscillation frequency. This is obtained with a little modification of the average formula, where the first (i=1) and the last (i=N) samples are dynamically given a weight which is less than unity at each average cycle. The weights are calculated inside the fractional averager operation 420 starting from the evaluation of the ratio Fs/Fm. Each weight conforms to the amount of time (less than one sample time) that the sample contributes to the average window. In doing this, the equivalent average time turns from the conventional N*Ts into (w_left+N−2+w_right)*Ts, where w_left and w_right are the aforementioned weights. The programmable averaging window of the fractional averager operation 420 is thus adapted to the required input/output data rate in order to filter out the dither spectral components, and the output data rate for the averaged digital signal AVGout is adapted to the SAR sampling frequency.

As previously noted, the temperature dependent resistance is expressed as:

$$R(T) = R_0(1 + \alpha_{R1} \cdot \Delta T + \alpha_{R2} \cdot \Delta T^2)$$

The normalized resistance is thus:

$$R_{norm} = \frac{R(T)}{R_0} = (1 + \alpha_{R1} \cdot \Delta T + \alpha_{R2} \cdot \Delta T^2)$$

The bridge current Ibridge is defined as:

$$Ibridge(T) = \frac{V_{bias}}{R(T)} = \frac{V_{bias}}{R_0 \cdot R_{norm}(T)}$$

The normalized bridge current is thus defined as:

$$Ibridge_{norm}(T) = \frac{Ibridge(T)}{V_{bias}/R_0} = \frac{1}{1 + \alpha_{R1} \cdot \Delta T + \alpha_{R2} \cdot \Delta T^2} = 1/R_{norm}(T)$$

The input received from the ADC circuit 170 can be expressed as:

$$Vadc(T) = -\frac{Gcurr \cdot Rtia}{Vref} \cdot Ibridge(T) + \frac{Ios \cdot Rtia}{Vref}$$

where: Ibridge(T) is known; Gcurr=m/(j*2$^m$) with m defined during calibration (along with k) as discussed above; Rtia is the resistance of the feedback resistor for the transimpedance amplifier which sets the gain Gtia; Vref is the reference voltage which sets the full scale for the SAR DAC; and Ios is the current necessary to remove the offset as previously explained, this current being equal to k times the current-DAC least significant bit, with defined during calibration (along with m) as discussed above.

So, the voltage Vadc may be expressed as:

$$Vadc(T) = -\frac{Gcurr \cdot Rtia}{Vref} \cdot \frac{Vbias}{R_0} \cdot Ibridge_{norm}(T) + \frac{Ios \cdot Rtia}{Vref}$$

This represents the starting point of the DSP process. Solving the foregoing equation for Ibridge$_{norm}$ reveals:

$$Ibridge_{norm} = \left(Vadc - \frac{Ios \cdot Rtia}{Vref}\right) \cdot \left(-\frac{Vref \cdot R_0}{Gcurr \cdot Ttia \cdot Vbias}\right)$$

where:

$$Gdsp = -\frac{Vref \cdot R_0}{Gcurr \cdot Ttia \cdot Vbias} \text{ and } OSdsp = -\frac{Ios \cdot Rtia}{Vref}$$

The averaged digital signal AVGout is then processed by a DSP algorithm 422, in response to the signals Gdsp and OSdsp, to generate a first digital signal Ibridge$_{norm}$ which is the normalized current flowing through the bridge circuit 102 in accordance with:

$$Ibridge_{norm} = (Vadc + OSdsp) \cdot (Gdsp)$$

As the analog settings are well known after calibration, the DSP is programmed with the values for Gdsp and OSdsp. Knowing these values, the normalized current through the bridge circuit 102 may be calculated from the samples of the voltage Vadc output by the fractional averager.

Once the normalized current is determined, the calculation of both the temperature and the inverse of the sensitivity is a matter of performing mathematical operations. For temperature, it is necessary to solve the second order equation that relates the normalized bridge current to the normalized resistance. Once the temperature is known, the reciprocal value of the sensitivity is computed from:

$$\frac{1}{(1+\alpha_{S1}\cdot\Delta T+\alpha_{S2}\cdot\Delta T^2)}$$

Note: a direct solution of the second order equation can lead to wrong and unstable results because of the fixed point representation of the values in the DSP. The use of multiple, intermediate steps, as will be discussed herein, in performing the calculation is preferred.

Figure 11:
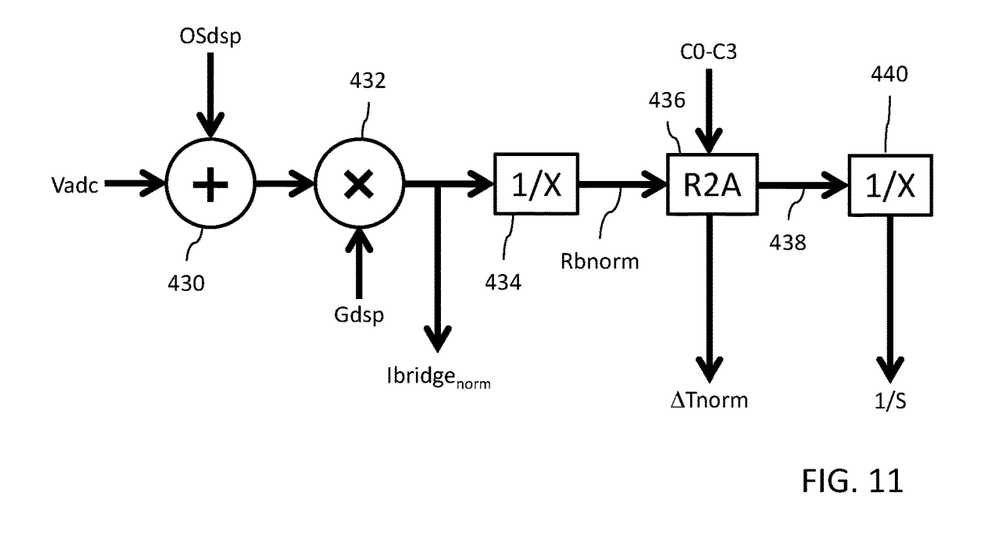
FIG. 11 is a block diagram of the DSP algorithm.

FIG. 11 shows a block diagram of the DSP processing operation 422. A deeper description of the DSP algorithm is now provided.

After the digital signal Vadc is processed by the fractional averager, the samples of the signal Vadc (signal AVGout) are fed as input to the DSP block that performs the main processing algorithm. The first section of the algorithm involves a sum of the input with OSdsp (reference 430) and the multiplication of the result with Gdsp (reference 432). This will produce the first digital signal which is the normalized bridge current (Ibridge$_{norm}$) as previously explained.

The next step is to calculate the temperature value starting from the normalized current. As the DSP implements fixed-point calculations only, an immediate solution of the second order equation given by 1/Ibridge$_{norm}$=(1+$\alpha_{R1}\cdot\Delta T$+$\alpha_{R2}\cdot\Delta T^2$) would suffer from round-off errors that would make the results wrong or unstable. For this reason, it was manipulated through the definition of some intermediate values that depend only on the α coefficients and that have been made programmable from register instead of being calculated in runtime. This involves multiple steps as follows:

a) the normalized current value is processed (reference 434) in order to compute its reciprocal value (1/X), which is the normalized resistance (Rbnorm); and b) perform the R2A process (reference 436) which solves the second order equation to generate the second digital signal ΔTnorm in accordance with the function:

$$\Delta T\text{norm}=\alpha_{S1}\cdot\Delta T$$

$$\alpha_{S1}\cdot\Delta T = -C0 + 2^{\frac{h}{2}}\cdot\text{sign}(\alpha_{S1})\sqrt{C1(C2+Rbnorm-1)}$$

where:

The process here is performed through some intermediate steps as follows: i) compute Rbnorm−1; ii) sum the result of step i) with C2 and multiply the result by C1; iii) compute the square root of the result from step ii); iv) multiply the result from step iii) by $$2^{\frac{h}{2}}.$$

sign($\alpha_{S1}$); and v) sum the result of step iv) with −C0.

It will be noted that h, C0, C1, C2, C3 are precalculated coefficients that depend only on the mechanical coefficients that in turn are technology-dependent. The equations for the coefficients are as follows:

$$C0 = \frac{\alpha_{R1}\cdot\alpha_{S1}}{2\alpha_{R2}}$$

$$C1 = \frac{\alpha_{S1}^2}{\alpha_{R2}\cdot 2^h}$$

$$C2 = \frac{\alpha_{R1}^2}{4\alpha_{R2}}$$

$$C3 = \frac{\alpha_{S2}}{\alpha_{S2}^2}$$

$$h = 2\cdot\text{floor}\left(\frac{\left|\log\left(\frac{\alpha_{S1}^2}{\alpha_{R2}}\right)\right|}{2\log(2)}\right)$$

where: $\alpha_{R1}$ is the first-order temperature coefficient that relates the bridge resistance to the temperature; $\alpha_{R2}$ is the second-order temperature coefficient that relates the bridge resistance to the temperature; $\alpha_{S1}$ is the first-order temperature coefficient that relates the sensitivity to the temperature; and $\alpha_{S2}$ is the second-order temperature coefficient that relates the sensitivity to the temperature. Note: there is no specific relationship between the $\alpha_R$ and the $\alpha_S$ coefficients.

Once the $\Delta T\text{norm}=\alpha_{S1}\cdot\Delta T$ product is computed, the R2A process (reference 436) further computes the equivalent of the $1+\alpha_{S1}\Delta T+\alpha_{S2}\Delta T^2$ polynomial:

$$1+T_{norm}+C_3\cdot T_{norm}^2$$

This result is passed as signal 438 for processing by a 1/X function (reference 440) that functions to compute the reciprocal of the value. The result is a value which is the reciprocal of the sensitivity S. It will be noted that it is the reciprocal of the sensitivity (i.e., 1/S), not the sensitivity (S) itself which is necessary for making the sensitivity correction. The reason for this is that multiplication of the reciprocal of the sensitivity by Vout=S(T)·σ(t)·Vbia will directly give the motion status of the MEMS:

$$Vout\cdot S_{norm} =$$

$$S(T)\cdot\sigma(t)\cdot Vbias\cdot\frac{1}{1+T_{norm}+C_3\cdot T_{norm}^2} = S_0\cdot\sigma(i)\cdot Vbias$$

It will be noted that, as a result, only the time varying motion component σ(t) and multiplicative constants remain.

Again, as previously noted, the DSP 180 implements fixed-point calculations only. Thus, an immediate solution of the above equations would suffer from round-off errors that would make the results wrong or unstable. For this reason calculation was manipulated through the definition of some intermediate values that depend only on the α coefficients and that have been made programmable from a register instead of being calculated in runtime.

It will be understood, however, that a suitable polynomial approximation for directly mapping the values of the current to the output gain and temperature could instead be used. An advantage of this solution is a reduction in both the area and the computational effort for an even more efficient design.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A circuit, comprising:
a bridge driver circuit configured to apply a bias voltage across first and second input nodes of a resistive bridge circuit;
a sensing circuit configured to sense a bridge current that flows through said resistive bridge circuit in response to the applied bias voltage;
wherein the sensing circuit indirectly senses the bridge current by sensing a drive current applied to the first input node by the bridge driver circuit, sensing a bias current of the bridge driver circuit and sensing a common mode current of the bridge driver circuit and generating a source current from a summation of the sensed drive current, sensed bias current and sensed common mode current;
a first processing circuit configured to determine a temperature dependent sensitivity of said resistive bridge circuit from the source current; and
a second processing circuit configured to process a voltage output at first and second output nodes of said resistive bridge circuit and apply a temperature correction in response to the determined temperature dependent sensitivity.

2. The circuit of claim 1, wherein the resistive bridge circuit is configured to sense a physical property, and wherein the second processing circuit processes the voltage output to generate an output signal indicative of the sensed physical property.

3. The circuit of claim 2, wherein the physical property is pressure.

4. The circuit of claim 2, wherein the physical property is movement.

5. The circuit of claim 4, wherein the movement is an angle of deflection.

6. The circuit of claim 1, wherein the sensing circuit comprises a first current mirroring circuit configured to sense the drive current applied to the first input node, a second current mirroring circuit configured to sense the bias current of the bridge driver circuit and a third current mirroring circuit configured to sense the common mode current of the bridge driver circuit.

7. The circuit of claim 1, wherein the bridge driver circuit applies a first drive current to the first input node of said resistive bridge circuit, applies a first bias current to the first input node of said resistive bridge circuit and sinks a first common mode current from the first input node of said resistive bridge circuit, and wherein the sensing circuit generates said source current from a sensing of the first drive current, first bias current and first common mode current.

8. The circuit of claim 7, wherein the source current is generated by subtracting the sensed first bias current and sensed first common mode current from the sensed first drive current.

9. The circuit of claim 7, wherein the first processing circuit processes the source current to determine the temperature dependent sensitivity.

10. The circuit of claim 9, wherein processing the source current comprises:
determining a normalized bridge current for the resistive bridge circuit from the source current;
determining a normalized resistance of the resistive bridge circuit from the normalized bridge current;
calculating the normalized temperature of the resistive bridge circuit from the normalized resistance; and
outputting the temperature dependent sensitivity as a function of the normalized temperature.

11. The circuit of claim 1, wherein the first processing circuit processes the source current to determine the temperature dependent sensitivity by:
determining the bridge current of said resistive bridge circuit from the source current;
determining a temperature of said resistive bridge circuit from a relationship between the determined bridge current and resistance said resistive bridge circuit; and
determining the temperature dependent sensitivity as a function of the determined temperature.

12. The circuit of claim 11, wherein the first processing circuit comprises:
a first current digital to analog conversion circuit configured to scale the source current by a first factor to perform a gain adjustment of the source current;
a second current digital to analog conversion circuit configured to scale a temperature independent source current by a second factor to perform an offset adjustment of the source current; and
wherein the first processing circuit determines the temperature dependent sensitivity of said resistive bridge circuit from the gain and offset adjusted source current.

13. The circuit of claim 12, wherein the first and second factors are set using a calibration process.

14. The circuit of claim 13, wherein the calibration process determines values of the first and second factors which will produce a voltage signal in response to the source current that has a certain dynamic range.

15. The circuit of claim 14, wherein the calibration process comprises:
selecting starting values for the first and second factors with the resistive bridge circuit at a first temperature and generating a first value of said voltage signal;
changing the value of one of the first and second factors with the resistive bridge circuit at the first temperature and generating a second value of said voltage signal;
changing the temperature of the resistive bridge circuit to a first temperature and generating a third value of said voltage signal;
processing the first, second and third values of the voltage signal to determine coefficients which relate the voltage signal to change in temperature of the resistive bridge circuit;
selecting values of the first and second factors which will produce the certain dynamic range for the voltage signal.

16. The circuit of claim 11, wherein determining the source current comprises subtracting the sensed bias current of the bridge driver circuit from the sensed drive current.

17. The circuit of claim 11, wherein determining the source current comprises subtracting the sensed common mode current of the bridge driver circuit from the sensed drive current.

18. A circuit, comprising:
a bridge driver circuit configured to apply a bias voltage across first and second input nodes of a resistive bridge circuit,
wherein the bridge driver circuit applies a first drive current to the first input node of said resistive bridge circuit and applies a second drive current to the second input node of said resistive bridge circuit;
a sensing circuit configured to sense the first and second drive currents applied to said resistive bridge circuit, wherein the sensing circuit generates a sensed source current from the sensing of the first drive current and generates a sensed sink current from the sensing of the second drive current;
a first processing circuit configured to determine a temperature dependent sensitivity of said resistive bridge circuit from the sensed source and sink currents, wherein the first processing circuit comprises:
an analog to digital converter circuit configured to convert the sensed source and sink currents to a digital signal; and
a digital signal processing circuit configured to process the digital signal to generate the temperature dependent sensitivity; and
a second processing circuit configured to process a voltage output at first and second output nodes of said resistive bridge circuit and apply a temperature correction in response to the determined temperature dependent sensitivity.

19. The circuit of claim 18, wherein the digital signal processing circuit is configured to:
determine the bridge current of said resistive bridge circuit from the digital signal;
determine a temperature of said resistive bridge circuit from a relationship between the determined bridge current and resistance said resistive bridge circuit; and
determine the temperature dependent sensitivity as a function of the determined temperature.

20. The circuit of claim 18, wherein the first processing circuit further comprises:
a first current digital to analog conversion circuit configured to scale the sensed source current;
a second current digital to analog conversion circuit configured to scale the sensed sink current;
wherein the scaling of the sensed source and sink currents performs a gain adjustment to the sensed source and sink currents.

21. The circuit of claim 20, wherein the first processing circuit further comprises:
a third current digital to analog conversion circuit configured to scale a temperature independent source current that is subtracted from the scaled sensed source current;
a fourth current digital to analog conversion circuit configured to scale a temperature independent sink current that is subtracted from the scaled sensed sink current;
wherein the scaling of the temperature independent source and sink currents performs an offset adjustment to the sensed source and sink currents.

22. The circuit of claim 21, wherein the analog to digital converter circuit converts the gain and offset adjusted source and sink currents to generate said digital signal.

23. The circuit of claim 18, wherein the digital signal processing circuit is configured perform a filtering of the digital signal to generate a filtered signal and apply a digital signal algorithm to the filtered signal to generate the temperature dependent sensitivity.

24. The circuit of claim 23, wherein filtering comprises performing a fractional averaging of the digital signal.

25. The circuit of claim 23, wherein the digital signal algorithm operates to:
generate a normalized bridge current from the filtered signal;
determine a normalized resistance of the resistive bridge circuit from the normalized bridge current;
calculate the normalized temperature of the resistive bridge circuit from the normalized resistance; and
output the temperature dependent sensitivity as a function of the normalized temperature.

26. The circuit of claim 25, wherein the normalized bridge current is generated as a function of the filtered signal and the bias voltage applied to the resistive bridge circuit.

27. The circuit of claim 25, wherein the normalized resistance is determined as a function of a reciprocal of the normalized bridge current.

28. The circuit of claim 25, wherein calculating the normalized temperature comprises solving a second order equation that relates the normalized bridge current to the normalized resistance.

29. The circuit of claim 25, wherein outputting the temperature dependent sensitivity as a function of the normalized temperature ($T_{norm}$) is depending on the function: $1+T_{norm}+C_3T^2_{norm}$, where C3 is a constant dependent on a second order second-order temperature coefficient that relates sensitivity to temperature.

30. The circuit of claim 18, further comprising said resistive bridge circuit.

31. The circuit of claim 30, wherein the resistive bridge circuit is a Wheatstone bridge.

32. The circuit of claim 1, further comprising said resistive bridge circuit.

33. The circuit of claim 32, wherein the resistive bridge circuit is a Wheatstone bridge.

34. A circuit, comprising:
a bridge driver circuit including a first current source configured to source a drive current to a first input node of a resistive bridge circuit having a second input node and a pair of output nodes;
a current mirroring circuit including said current source, said current mirroring circuit configured to mirror the drive current and generate a source current;
a first scaling circuit configured to scale the source current by a first scaling factor;
a second current source configured to generate a temperature independent current;
a second scaling circuit configured to scale the temperature independent current by a second scaling factor;
an amplifier circuit configured to subtract the scaled temperature independent current from the scaled source current;
a first processing circuit configured to determine a temperature dependent sensitivity of said resistive bridge circuit from an output of the amplifier circuit; and
a second processing circuit configured to process a voltage output at the pair of output nodes of said resistive bridge circuit and apply a temperature correction in response to the determined temperature dependent sensitivity.

35. The circuit of claim 34, wherein the resistive bridge circuit is configured to sense a physical property selected from the group consisting of a pressure and an angular movement, and wherein the second processing circuit processes the voltage output to generate an output signal indicative of the sensed physical property.

36. The circuit of claim 34, wherein the first processing circuit operates to:
determine a normalized bridge current for the resistive bridge circuit from the output of the amplifier circuit;
determine a normalized resistance of the resistive bridge circuit from the normalized bridge current;
calculate the normalized temperature of the resistive bridge circuit from the normalized resistance; and
output the temperature dependent sensitivity as a function of the normalized temperature.

37. The circuit of claim 34:
wherein the first scaling circuit comprises a first current digital to analog conversion circuit configured to scale the source current by the first scaling factor to perform a gain adjustment; and
wherein the second scaling circuit comprises a second current digital to analog conversion circuit configured to scale the temperature independent source current by the second scaling factor to perform an offset adjustment.

38. The circuit of claim 34, wherein the first and second scaling factors are set using a calibration process.

39. The circuit of claim 38, wherein the calibration process determines values of the first and second scaling factors which will produce a voltage signal at the output of the amplifier circuit that has a certain dynamic range.

40. The circuit of claim 39, wherein the calibration process comprises:
selecting starting values for the first and second scaling factors with the resistive bridge circuit at a first temperature and generating a first value of said voltage signal;
changing the value of one of the first and second scaling factors with the resistive bridge circuit at the first temperature and generating a second value of said voltage signal;
changing the temperature of the resistive bridge circuit to a first temperature and generating a third value of said voltage signal;
processing the first, second and third values of the voltage signal to determine coefficients which relate the voltage signal to change in temperature of the resistive bridge circuit; and
selecting values of the first and second scaling factors which will produce the certain dynamic range for the voltage signal.

41. The circuit of claim 34, wherein the first processing circuit comprises:
an analog to digital converter circuit configured to convert the output of the amplifier circuit to a digital signal; and
a digital signal processing circuit configured to process the digital signal to generate the temperature dependent sensitivity.

42. The circuit of claim 41, wherein the digital signal processing circuit is configured perform a filtering of the digital signal to generate a filtered signal and apply a digital signal algorithm to the filtered signal to generate the temperature dependent sensitivity.

43. The circuit of claim 42, wherein filtering comprises performing a fractional averaging of the digital signal.

44. The circuit of claim 42, wherein the digital signal algorithm operates to:
generate a normalized bridge current from the filtered signal;
determine a normalized resistance of the resistive bridge circuit from the normalized bridge current;
calculate the normalized temperature of the resistive bridge circuit from the normalized resistance; and
output the temperature dependent sensitivity as a function of the normalized temperature.

45. The circuit of claim 44, wherein the normalized bridge current is generated as a function of the filtered signal and the bias voltage applied to the resistive bridge circuit.

46. The circuit of claim 44, wherein the normalized resistance is determined as a function of a reciprocal of the normalized bridge current.

47. The circuit of claim 44, wherein calculating the normalized temperature comprises solving a second order equation that relates the normalized bridge current to the normalized resistance.

48. The circuit of claim 44, wherein outputting the temperature dependent sensitivity as a function of the normalized temperature ($T_{norm}$) is depending on the function: $1+T_{norm}+C_3 T^2_{norm}$, where C3 is a constant dependent on a second order second-order temperature coefficient that relates sensitivity to temperature.

49. The circuit of claim 34, further comprising said resistive bridge circuit.

50. The circuit of claim 49, wherein the resistive bridge circuit is a Wheatstone bridge.

* * * * *